US012753835B2

(12) United States Patent
Mottier et al.

(10) Patent No.: US 12,753,835 B2
(45) Date of Patent: Oct. 6, 2026

(54) TIGHT CONNECTION DEVICE FOR THE TRANSFER OF OBJECTS INCLUDING A STUB END PROVIDED WITH A RELEASE LUG

(71) Applicant: GETINGE LIFE SCIENCE FRANCE, Vendome (FR)

(72) Inventors: Emmanuel Mottier, Aze (FR); Sébastien Blondeau, Epuisay (FR)

(73) Assignee: GETINGE LIFE SCIENCE FRANCE, Vendome (FR)

( * ) Notice: Subject to any disclaimer, the term of this patent is extended or adjusted under 35 U.S.C. 154(b) by 11 days.

(21) Appl. No.: 18/867,749

(22) PCT Filed: May 22, 2023

(86) PCT No.: PCT/EP2023/063676
§ 371 (c)(1),
(2) Date: Nov. 20, 2024

(87) PCT Pub. No.: WO2023/227541
PCT Pub. Date: Nov. 30, 2023

(65) Prior Publication Data

US 2025/0341254 A1 Nov. 6, 2025

(30) Foreign Application Priority Data

May 23, 2022 (FR) ....................................... 2204929

(51) Int. Cl.
*F16J 13/18* (2006.01)
*G21F 7/005* (2006.01)

(52) U.S. Cl.
CPC ............... *F16J 13/18* (2013.01); *G21F 7/005* (2013.01)

(58) Field of Classification Search
CPC .. F16J 13/18; F16J 13/12; G21F 7/005; B01L 1/02
(Continued)

(56) References Cited

U.S. PATENT DOCUMENTS

D563,620 S 3/2008 Dong
8,105,556 B2 * 1/2012 Romanauskas ....... B04B 5/0414 422/549
(Continued)

FOREIGN PATENT DOCUMENTS

| | | | |
|---|---|---|---|
| FR | 2695343 | A1 | 3/1994 |
| FR | 2777059 | A1 | 10/1999 |
| WO | 2018028821 | A2 | 2/2018 |

OTHER PUBLICATIONS

Baessler et al., "Chaper 6—Aseptic Transfer Systems Into and Out of Barrier Isolators and RABS", Containment Technology, Springer-Verlag, Berlin, Heidelberg, pp. 81-104, Jan. 1, 2023.
(Continued)

*Primary Examiner* — Orlando E Aviles
*Assistant Examiner* — Sanjidul Islam
(74) *Attorney, Agent, or Firm* — McDonald Hopkins LLC

(57) ABSTRACT

A device for the tight transfer of objects from a container towards a cell, comprising: a cell flange intended to be fastened to a cell wall, and a container flange intended to equip the container, these two flanges being provided with a coupling; the cell flange being equipped with a hinge carrying a cell door; the container flange having a container door, with a bayonet connection to block this door, this connection including inner eyelets; connection for securing the container door to the cell door; the cell flange being equipped with a stub end movable between a guide position partially fitted into the central opening, and a clear position remote from the central opening. The stub end includes a lug
(Continued)

fitting between two eyelets of the container flange in the guide position.

8 Claims, 5 Drawing Sheets

(58) Field of Classification Search
USPC ................................ 220/23.4, 501; 141/388
See application file for complete search history.

(56) References Cited

U.S. PATENT DOCUMENTS

| | | | |
|---|---|---|---|
| 8,950,624 | B2 | 2/2015 | Sacca |
| 2013/0167442 | A1 | 7/2013 | Sacca |

OTHER PUBLICATIONS

Search Report for International Application No. PCT/EP2023/063676 mailed Aug. 16, 2023.

* cited by examiner

TIGHT CONNECTION DEVICE FOR THE TRANSFER OF OBJECTS INCLUDING A STUB END PROVIDED WITH A RELEASE LUG

CROSS-REFERENCE TO RELATED APPLICATIONS

This is the National Stage application of PCT international application PCT/EP2023/063676, filed on May 22, 2023, which claims the priority of French Patent Application No. 2204929, filed May 23, 2022, both of which are incorporated herein by reference in their entireties.

TECHNICAL FIELD

The invention relates to the tight transfer of objects from a tight container towards a cell, with a double-door connection system equipped with a stub end for channeling the flow of these objects in the cell.

PRIOR ART

In different industrial sectors, tasks are performed in a confined atmosphere, to protect the environment for example from radioactivity or toxicity, or to perform these tasks in an aseptic atmosphere, or both simultaneously.

The transfer of objects from one container towards a cell without breaking the seal is ensured with a double-door connection device, known for example from the documents FR2695343 and U.S. Pat. No. 8,950,624.

For example, such a device is used for packaging drugs. A filling line is then installed in the cell, and small-size objects such as flask caps are transferred into the cell to feed this line.

In such a device, the cell is equipped with a flange closed on the internal side by a door mounted on a hinge equipping this flange, and small-size objects such as caps of flasks are transferred into the cell to feed this line.

The connection consists of engaging the flange of the container in that of the cell, and in pivoting it on itself, which has the effect of:

- securing the two flanges to each other by engaging a first bayonet connection which is a flange-flange connection;
- securing the two doors to each other by engaging a second bayonet connection which is a door-door connection;
- detaching the door of the container off its flange by disengaging a third bayonet connection which is a flange-door connection.

After connection, the cell door is pivoted inwards to open it: the door of the container then being rigidly connected to that of the cell by the door-door connection, it is carried with the cell door to remove it from the container flange.

Complementarily, the device includes on the internal side of the cell a movable stub end which is an axisymmetric element fitting partially into the opening of the cell flange to extend it, in order to channel the flow of the objects, for example towards a vibrating bowl located in the cell. This stub end also ensures that the objects are transferred without being in contact with the junction annular region of the two flanges, called contamination ring, which might be contaminated.

Once the objects have been transferred, the stub end is cleared away from the opening of the cell flange, to clear this opening and to enable the cell door to be folded over against this opening with the container door it carries.

The container is then pivoted on itself in the opposite direction, which has the effect of:

- securing the container door to the container flange;
- detaching the container door off the cell door;
- detaching the container flange off the cell flange.

In such a device, the container flange includes inner eyelets projecting radially inwards while being evenly spaced apart at its inner circumference. In turn, the container door includes outer eyelets intended to cooperate with these inner eyelets so as to form the flange-door connection.

Upon completion of the transfer, objects that have not flowed might remain positioned between two inner eyelets of the container flange, so that they block the closure of the door as they form an obstacle to the passage of an outer eyelet of the container door.

The invention aims to provide a solution allowing overcoming this drawback.

DISCLOSURE OF THE INVENTION

To this end, an object of the invention is a device for the tight transfer of objects from a container containing objects towards a cell, this device comprising:

- a cell flange intended to be fastened to a wall of the cell, and a container flange intended to equip the container, these two flanges being provided with tight coupling means;
- the cell flange being equipped with a hinge carrying a cell door capable of occupying a closed state to seal a central opening of the cell flange and an open state to clear this central opening;
- the container flange being equipped with a container door, the container flange and the container door being equipped with a bayonet connection allowing blocking the container door in the container flange in order to close it or to release this container door, this bayonet connection including inner eyelets projecting radially inwards the container flange;
- the cell door and the container door being provided with means for securing and detaching the container door and the cell door;
- the cell flange being equipped with a stub end movable between a guide position in which it extends the central opening towards the inside of the cell, and a clear position remote from the central opening to enable the closure of the cell door;

this being characterised in that in that the stub end includes a release lug fitting between two eyelets of the container flange when this stub end is in the guide position.

With this arrangement, the lug which fits between the eyelets of the container eyelets prevents objects from remaining immobile between these eyelets when the transfer is completed, so that these cannot hinder the closure of the cell door.

The invention also relates to a device thus defined, wherein the release lug extends parallel to an axis of revolution of the stub end.

The invention also relates to a device thus defined, wherein the release lug is offset radially inwards the stub end with respect to an inner axisymmetric face of this stub end.

The invention also relates to a device thus defined, wherein the release lug is carried by an inner face of the stub end.

The invention also relates to a device thus defined, wherein the release lug has a free end in the form of a rounded tip.

The invention also relates to a device thus defined, wherein the release lug is recessed.

The invention also relates to a device thus defined, wherein the release lug is formed by a bent rod whose ends are secured to an inner face of the stub end.

The invention also relates to a device thus defined, wherein the stub end includes two release lugs arranged symmetrically with respect to an axis of symmetry of the stub end.

The invention also relates to a stub end thus defined.

DETAILED DISCLOSURE OF PARTICULAR EMBODIMENTS

Figure 1:
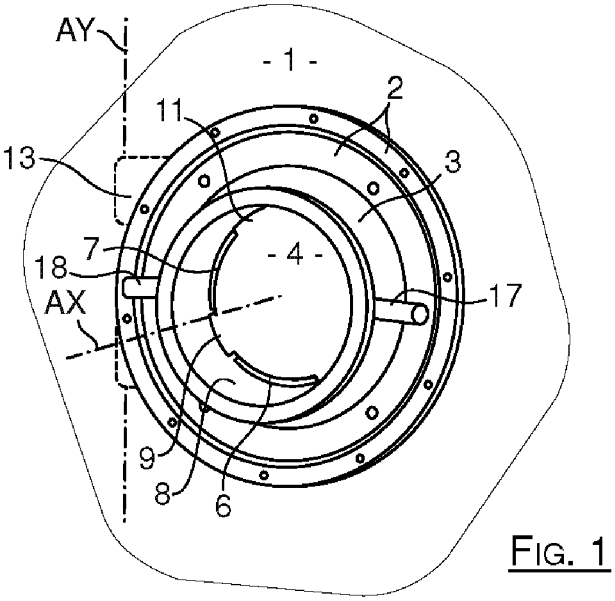
FIG. 1 shows a cell flange to which a container flange is connected viewed from outside the cell.

In FIG. 1, a wall 1 of a cell is equipped with a cell flange 2 in which a container flange 3 is fitted provided with a container door 4. The container itself, which is not represented, extends in the continuation of the flange 3, outside the cell, whereby it may consist of a flexible bag or a rigid case.

The container flange 3 includes four inner eyelets, also called inner legs, evenly distributed at 90° around a central axis AX of the flange 3, two of these inner eyelets, bearing the references 6 and 7 are visible in FIG. 1, these inner eyelets projecting radially towards the axis AX of a cylindrical inner face 8 of this flange 3.

The container door 4 comprises four outer eyelets, also called outer legs, evenly distributed at 90° around the axis AX, two of these outer eyelets, bearings the references 9 and 11 being visible in FIG. 1. These outer eyelets project radially from the circular outer perimeter of the door 4 so as to be able to fit each between two contiguous inner eyelets of the flange 3, like in the configuration of FIG. 1.

Figure 2:
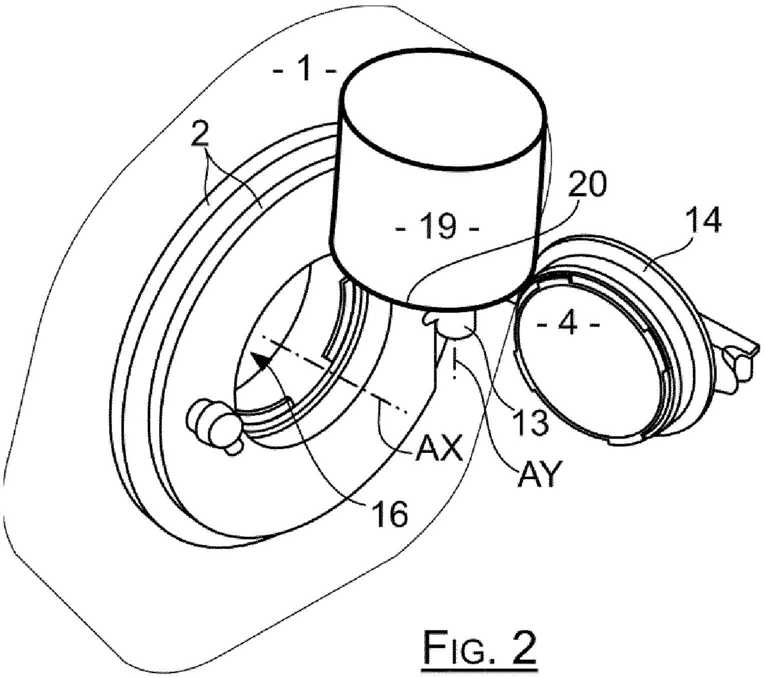
FIG. 2 shows a cell flange with its door opened and its stub end cleared away from the opening viewed from inside the cell.

The cell flange 2 is provided on the internal side of the cell with a hinge 13 on which a cell door 14 is mounted visible in FIG. 2. This cell door 14 opens inwards the cell to clear the central opening 16 of the flange 2, like in the configuration of FIG. 2. This door 14 can also occupy a position folded back onto the opening 16 to close it, which corresponds to the configuration of FIG. 1. As seen in FIGS. 1 and 2, the hinge 13 extends along an axis AY which is parallel with the wall 1 and which is here vertically oriented.

The connection of the container flange 3 consists in fitting its end into the cell flange 2, then making it pivot around the axis AX by means of two gripping handles 17 and 18 of this flange 3 which extend radially, which results in engaging a first bayonet connection, so-called flange-flange, not visible in the figures, to secure the two flanges. Thus, this first bayonet connection forms a means for coupling the two flanges.

This rotation also results in disengaging a second bayonet connection, so-called flange-door, corresponding to the inner 6, 7 and outer 9 and 11 eyelets to detach the container door 4 from the container flange 3. Thus, this second bayonet connection forms a means for blocking and releasing the container door.

It also results in engaging a third bayonet connection, so-called door-door, not visible, to secure the container door 4 to the cell door 14. Thus, this third bayonet connection forms a means for securing and detaching the container door and the cell door.

Once the container flange 3 is connected to the cell flange 2, the opening of the cell door 14 allows clearing the central opening 16 while moving with it the container door 4, which corresponds to the situation of FIG. 2.

As shown in this FIG. 2, the cell flange 2 is also equipped, on the internal side of the cell, with a stub end 19 herein shaped as a cylinder portion with an outer diameter substantially smaller than the inner diameter of the opening 16. This stub end 19 is a movable element which is secured to the flange 2 by moving means which are not represented.

It may occupy a clear position corresponding to that of FIG. 2, in which it is moved away from the opening 16 to enable the passage of the door 14 in order to open it or close it.

Figure 3:
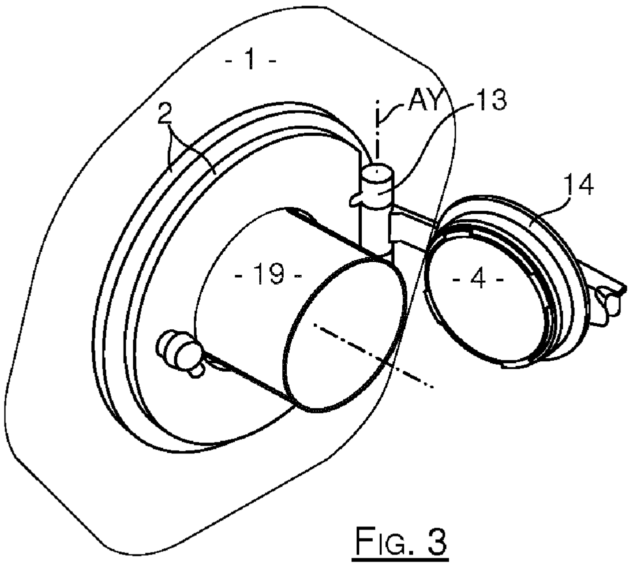
FIG. 3 shows a cell flange with its door opened and its stub end fitted into its opening viewed from inside the cell.

It may occupy a guide position in which its upstream circular edge 20 is fitted into the opening 16 concentrically with the latter while axially abutting on the inner eyelets 6, 7, which corresponds to the situation of FIG. 3.

This stub end allows channeling the objects to be transferred into the cell, for example in the direction of a receptacle intended to this end in the cell, and it also ensures that during transit thereof, the objects do not come into contact with the annular region corresponding to the junction of the cell flange 2 and the container flange 3, which is a region likely to be contaminated.

In the example of FIG. 2, the stub end is arranged so as to occupy a vertical position above the opening when it is in the clear position. Then, it may also be arranged so as to occupy a vertical position below the opening when it is in the clear position.

Figure 4:
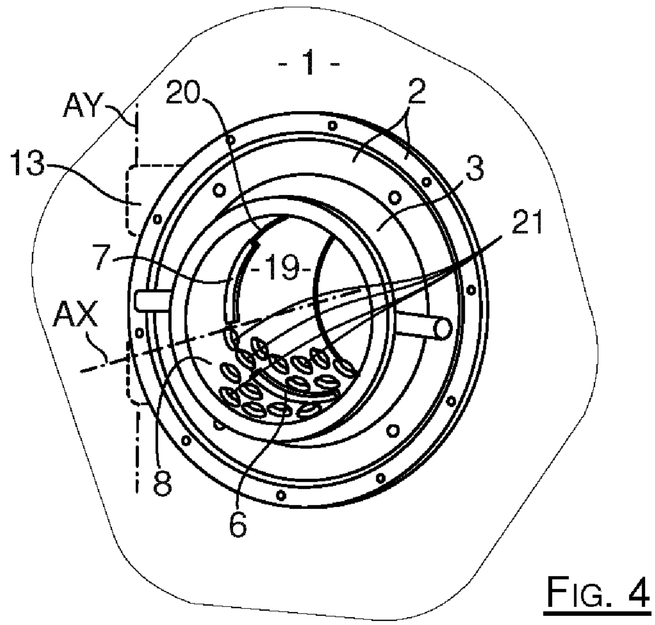
FIG. 4 shows a cell flange with it stub end fitted into its opening according to a view from outside the cell during the flow of objects in the cell.

As shown in FIG. 4, the transferred objects, bearing the reference 21, slip over the inner face 8 of the container flange 3 then over the inner face of the stub end 19 at the lower portions of these inner faces, because of gravity to which they are subjected.

Figure 5:
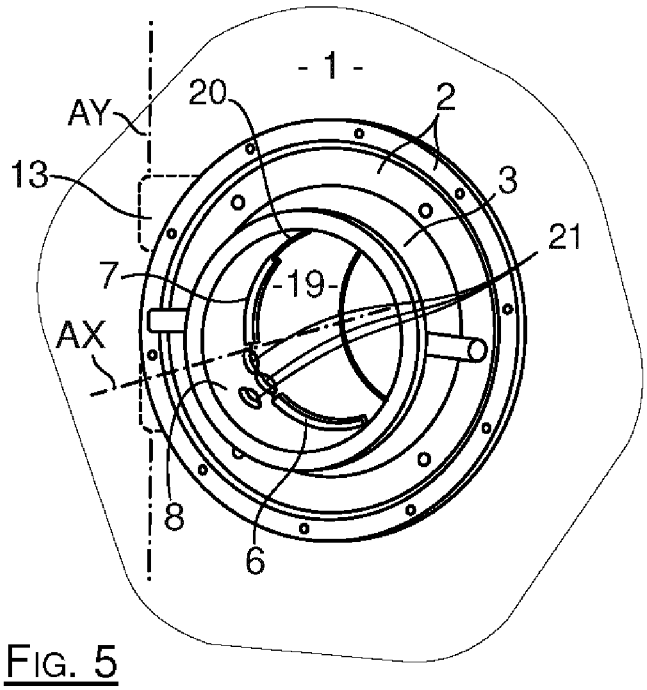
FIG. 5 shows a cell flange with a container flange which is connected thereto with the door opened and the stub end fitted into the opening viewed from outside the cell when objects that have not flowed remain in a region located between two inner eyelets.

Once the transfer is terminated, it might happen that some objects 21 have not left the opening and remain in place in a lower region of the face 8, as illustrated in FIG. 5, in which two objects have remained blocked between the two eyelets 6 and 7, over the inner face 8 of the container flange 3.

Figure 6:
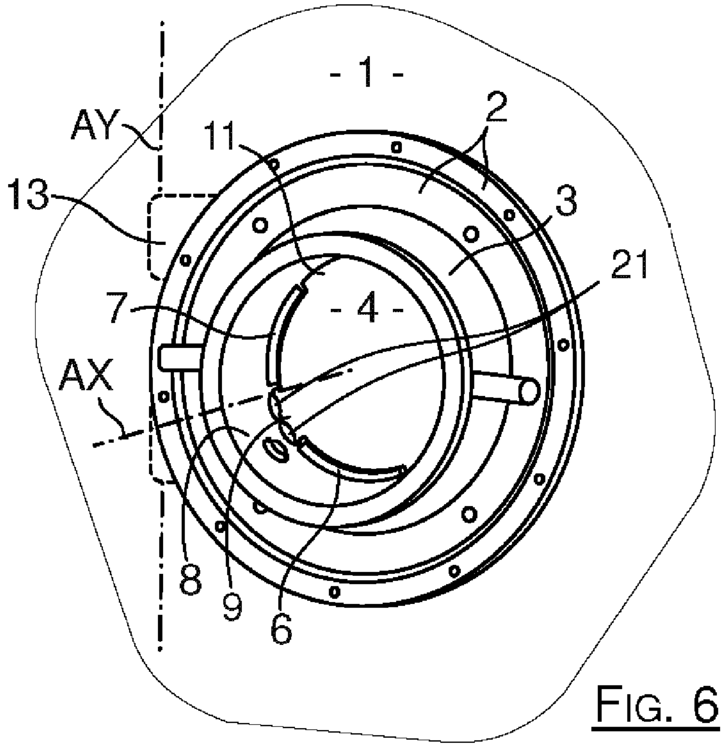
FIG. 6 shows a cell flange with a container flange which is connected thereto when the closure of the door is blocked by objects that have not flowed according to a view from outside the cell.
Figure 7:
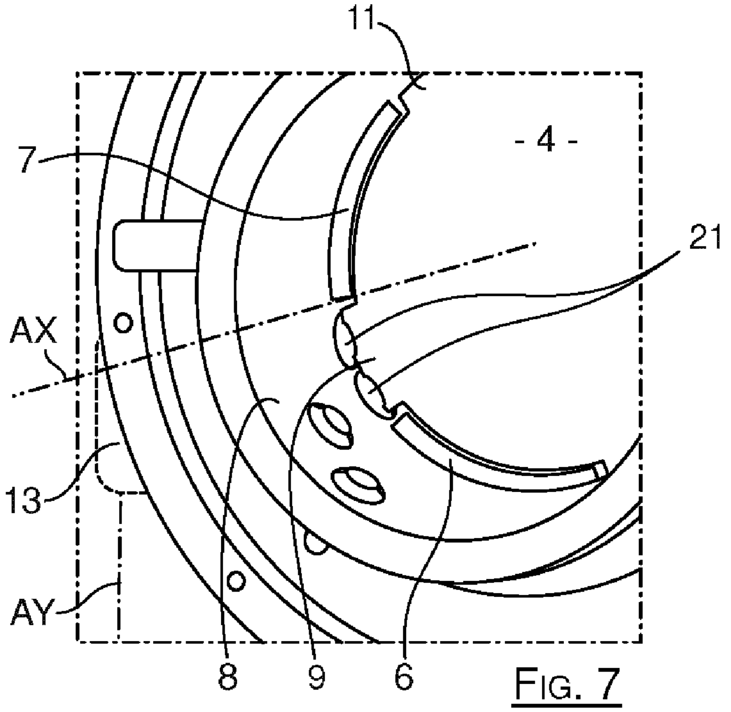
FIG. 7 shows an enlarged view of a cell flange portion with a container flange which is connected thereto when the closure of the door is blocked by objects that have not flowed, according to a view from outside the cell.

In this situation, after withdrawal of the stub end 19, folding the cell door 14 over might turn out to be impossible because of the presence of these objects 21. Indeed, as shown in FIGS. 6 and 7, when the cell door 14 is folded over, it carries with it the container door 4 whose outer eyelet 9 should fit substantially between the two inner eyelets 6 and 7 to enable the complete closure. Under these conditions, the objects 21 present in this retention area are crushed between the edge of the outer eyelet 9 and the inner face 8, which make the closure of the door impossible.

It should be noted that this interference is even more hindering as the objects remain in a region close to the axis AY of the hinge, since under these conditions, the angle of incidence of the door is substantially normal to that of the face 8.

If some objects 21 are retained in a region away from the axis AY, for example between the inner eyelet 6 and the inner eyelet (not visible) diametrically opposite to the eyelet 7, the incidence of the corresponding outer eyelet of the container door 4 is substantially tangent to the face 8 and parallel to the axis AX. In these conditions, the objects 21 that are retained are then simply pushed by the outer eyelet along the face 8 towards the container, so that they ultimately do not interfere with the closure.

According to the invention, the stub end 19 is equipped with a release lug 22 which extends parallel to the axisymmetric direction AX of the axisymmetric inner face of the stub end 19, to project according to the direction AX from the upstream circular edge 20 of this stub end. This lug is rigidly secured to the body of the stub end 19 or it forms an integral portion of this stub end.

This lug 22 is positioned on this edge 20 so as to fill the region extending circumferentially between the two inner eyelets 6, 7, it has a width substantially smaller than that of the space that circumferentially separates these eyelets 6 and 7 from each other, and it is positioned opposite this space.

Figure 9:
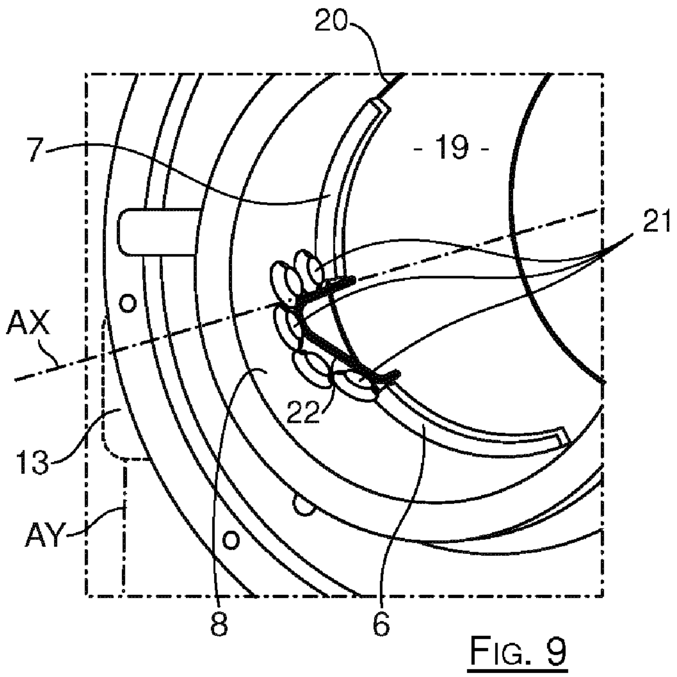
FIG. 9 shows an enlarged view of a cell flange with a container flange which is connected thereto with the release lug of its stub end fitted between two inner eyelets to keep objects that have not flowed away, according to a view from outside the cell.

As shown in FIG. 9, after transfer of objects 21, if some objects 21 have not been evacuated in the stub end 19, they are blocked by the lug 22 which prevents them from fitting into the retention area extending between the inner eyelets 6 and 7.

Under these conditions, after withdrawal of the stub end 19, the cell door 14 may be folded over so as to be hermetically closed, without any risk of this closure being hindered by the presence of objects, in order to enable the subsequent removal of the container.

Advantageously, this lug 22 is offset radially inwards with respect to the inner face of the stub end, to ensure that when it fits between the eyelets 6 and 7, i.e. when docking the stub end, there is no risk of it being in contact with the junction annular region of the two flanges which might be contaminated. In practice, the inner face of the stub end 19 extends in the continuation of the face 8 when the stub end is in the guide position, and the radial offset of the lug has a value smaller than the thickness of the transferred objects.

Figure 8:
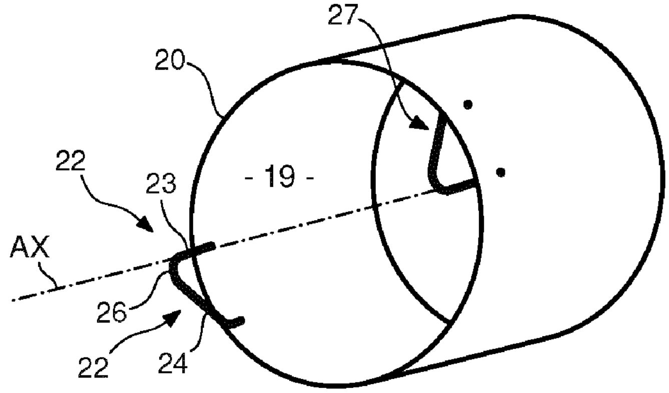
FIG. 8 shows a stub end equipped with two release lugs in accordance with the invention.
Figure 10:
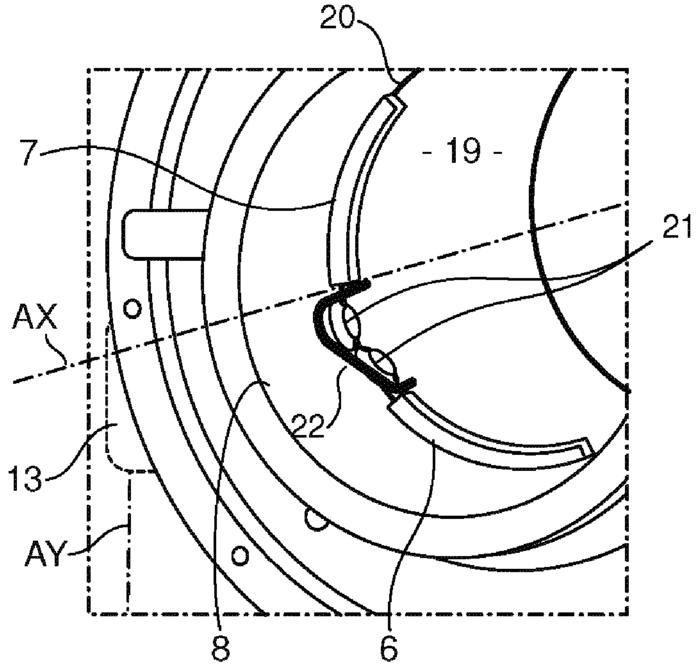
FIG. 10 shows an enlarged view of a cell flange with the release lug of its stub end fitted between two inner eyelets for capturing the objects that have not flowed, according to a view from outside the cell.

As shown in FIGS. 8 to 10, the release lug 22 is advantageously formed from a rod or bar which is bent according to a tip-like shape corresponding to the shape of the letter V, while having its ends rigidly secured to the edge 20 or to the inner face of the stub end 19.

More particularly, this rod is bent so as to form a longitudinal ramp 23 parallel to the axis AX, and an oblique ramp 24 inclined with respect to the axis AX. The junction of these two ramps 23 and 24 which extend parallel to the inner face of the body of the stub end 19 delimits the tip 26 of the lug 22, and the ends of these ramps are bent at a right angle in directions opposite to the axis AX so as to be anchored at the inner face of the stub end 19.

Advantageously, the tip-like shape is rounded so as not to damage the objects, and not to form a portion projecting inwards the cell when the stub end is in the clear position.

This lug 22 projects from the edge 20 so as to delimit a tip directed according to the axis AX, which enables it to fit easily between the two eyelets 6 and 7 while being properly centred therebetween, including in case of a shift of the positioning of the stub end 19 when it is placed at its guide position.

Furthermore, the oblique ramp 24 which extends at the lower portion of the lug allows guiding the objects towards the bottom of the face 8 when they transit during transfer thereof.

Moreover, if some objects 21 are immobilised in the inner region of the V-like shape delimited by the bent rod forming the lug 22, as illustrated in FIG. 10, the withdrawal of the stub end 19 to place it in the clear position is enough to extract these objects 21 in order to clear the space between the eyelets 6 and 7 to enable a normal closure of the door.

In other words, the recessed shape of the lug 22 allows bringing the objects with it during the withdrawal movement of the stub end 19 without crushing them.

Moreover, and as represented in FIG. 8, the stub end may be equipped with a second release lug 27 positioned so as to be symmetrical with the lug 22 with respect to the axis AX which corresponds to the axis of revolution of the stub end. Thus, the presence of two lugs 22 and 27 enables the same stub end to be arranged indifferently so as to be located either above or below the opening of the flange when it occupies its clear position.

The invention claimed is:

1. A device for the tight transfer of objects from a container containing objects towards a cell, this device comprising:

- a cell flange intended to be fastened to a wall of the cell, and a container flange intended to equip the container, these two flanges being provided with a first bayonet connection;
- the cell flange being equipped with a hinge carrying a cell door capable of occupying a closed state to seal a central opening of the cell flange and an open state to clear this central opening;
- the container flange being equipped with a container door, the container flange and the container door being equipped with a bayonet connection allowing blocking the container door in the container flange in order to close it or to release this container door, the first bayonet connection including inner eyelets projecting radially inwards the container flange;
- the cell door and the container door being provided with a second bayonet connection for securing and detaching the container door and the cell door;
- the cell flange being equipped with a stub end movable between a guide position in which it extends the central opening towards the inside of the cell, and a clear position remote from the central opening to enable the closure of the cell door;
- wherein the stub end includes a release lug fitting between two eyelets of the container flange when this stub end is in the guide position.

2. The device according to claim 1, wherein the release lug extends parallel to an axis (AX) of revolution of the stub end.

3. The device according to one of the preceding claims, wherein the release lug is offset radially inwards the stub end with respect to an inner axisymmetric face of this stub end.

4. The device according to claim 1, wherein the release lug is carried by an inner face of the stub end.

5. The device according to claim 1, wherein the release lug has a free end in the form of a rounded tip.

6. The device according to claim 1, wherein the release lug is recessed.

7. The device according to claim 1, wherein the release lug is formed by a bent rod whose ends are secured to an inner face of the stub end.

8. The device according to claim 1, wherein the stub end includes two release lugs arranged symmetrically with respect to an axis (AX) of symmetry of the stub end.

* * * * *